(12) United States Patent
Berger et al.

(10) Patent No.: US 9,158,694 B2
(45) Date of Patent: *Oct. 13, 2015

(54) MITIGATING BUSY TIME IN A HIGH PERFORMANCE CACHE

(71) Applicant: International Business Machines Corporation, Armonk, NY (US)

(72) Inventors: Deanna P. Berger, Poughkeepsie, NY (US); Michael F. Fee, Cold Spring, NY (US); Christine C. Jones, Poughkeepsie, NY (US); Arthur J. O'Neill, Poughkeepsie, NY (US); Diana L. Orf, Somerville, MA (US); Robert J. Sonnelitter, III, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 302 days.

This patent is subject to a terminal disclaimer.

(21) Appl. No.: 13/664,736

(22) Filed: Oct. 31, 2012

(65) Prior Publication Data

US 2013/0060997 A1    Mar. 7, 2013

Related U.S. Application Data

(63) Continuation of application No. 12/821,736, filed on Jun. 23, 2010, now Pat. No. 8,521,960.

(51) Int. Cl.
*G06F 12/08* (2006.01)

(52) U.S. Cl.
CPC ........ *G06F 12/0855* (2013.01); *G06F 12/0846* (2013.01); *G06F 12/084* (2013.01)

(58) Field of Classification Search
None
See application file for complete search history.

(56) References Cited

U.S. PATENT DOCUMENTS

| | | | |
|---|---|---|---|
| 5,860,100 A | 1/1999 | Feiste et al. | |
| 6,415,362 B1 | 7/2002 | Hardage et al. | |
| 6,684,297 B2 | 1/2004 | Chaudhry et al. | |
| 7,039,762 B2 | 5/2006 | Navarro et al. | |
| 7,076,597 B2 | 7/2006 | Webb, Jr. et al. | |
| 2001/0032299 A1 | 10/2001 | Teramoto | |
| 2003/0046517 A1* | 3/2003 | Lauterbach | 712/214 |
| 2004/0230745 A1 | 11/2004 | Navarro et al. | |
| 2004/0230761 A1 | 11/2004 | Check et al. | |
| 2006/0179230 A1 | 8/2006 | Fields et al. | |
| 2006/0184747 A1 | 8/2006 | Guthrie et al. | |
| 2007/0005942 A1* | 1/2007 | Vinitzky et al. | 712/220 |

OTHER PUBLICATIONS

Non-Final Office Action received for U.S. Appl. No. 12/821,736 dated Nov. 14, 2012.

(Continued)

*Primary Examiner* — Kaushikkumar Patel
(74) *Attorney, Agent, or Firm* — Fleit Gibbons Gutman Bongini & Bianco PL; Thomas Grzesik

(57) ABSTRACT

A method, information processing device, and computer program product mitigate busy time in a hierarchical store-through memory cache structure. A cache directory associated with a memory cache is divided into a plurality of portions each associated with a portion memory cache. Simultaneous cache lookup operations and cache write operations between the plurality of portions of the cache directory are supported. Two or more store commands are simultaneously processed in a shared cache pipeline communicatively coupled to the plurality of portions of the cache directory.

8 Claims, 8 Drawing Sheets

(56) References Cited

OTHER PUBLICATIONS

Fineberg, S., et al., "Performance Measurements of a User-Space DAFS Server with a Database Workload," Proceedings of the ACM SIGCOMM 2003 Workshops, Aug. 2003.

Weil, S., et al., "Ceph: A Scalable, High-Performance Distributed File System," USENIS Association, Associaton, OSDI '06: $7^{th}$ USENIX Symposiu on Operating Systems Design and Implementation, 2006.

Driscoll, G. et al., "Split Cache with Variable Interleave Boundary", Apr. 1, 1980, pp. 1-4.

* cited by examiner

MITIGATING BUSY TIME IN A HIGH PERFORMANCE CACHE

CROSS-REFERENCE TO RELATED APPLICATIONS

This application is continuation of and claims priority from U.S. patent application Ser. No. 12/821,736 filed on Jun. 23, 2010, now U.S. Pat. No. 8,521,960, the disclosure of which is hereby incorporated by reference in its entirety.

FIELD OF THE INVENTION

The present invention generally relates to microprocessors, and more particularly relates to high performance caches.

BACKGROUND OF THE INVENTION

An important aspect of system performance for large symmetric multiprocessing systems with a shared store in cache design is the ability to process stores from lower level caches in an expedient manner. In cache systems utilizing a shared pipeline structure, stores are processed by sequentially accessing the shared pipeline to access the cache arrays. Some conventional systems utilized SRAM arrays for the cache, which had a busy time of up to 2 cycles. In a system with a shared sequential pipeline, stores could therefore be processed every 2 cycles.

Other conventional systems introduced the usage of embedded dynamic random access memory (EDRAM) arrays for the cache. EDRAM has an advantage of being much denser, thus allowing for larger caches, but also a drawback of having a longer array busy time, e.g., up to 4 cycles. This longer busy time significantly reduces the store throughput of the shared pipeline, which ultimately negatively impacts system performance.

SUMMARY OF THE INVENTION

In one embodiment, a method for mitigating busy time in a hierarchical store-through memory cache structure is disclosed. The method comprises dividing a cache directory associated with a memory cache into a plurality of portions each associated with a portion memory cache. Simultaneous cache lookup operations and cache write operations between the plurality of portions of the cache directory are supported. Two or more store commands are simultaneously processed in a shared cache pipeline communicatively coupled to the plurality of portions of the cache directory based on the supporting.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one as or more than one. The term plurality, as used herein, is defined as two as or more than two. Plural and singular terms are the same unless expressly stated otherwise. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Operating Environment

Figure 1:
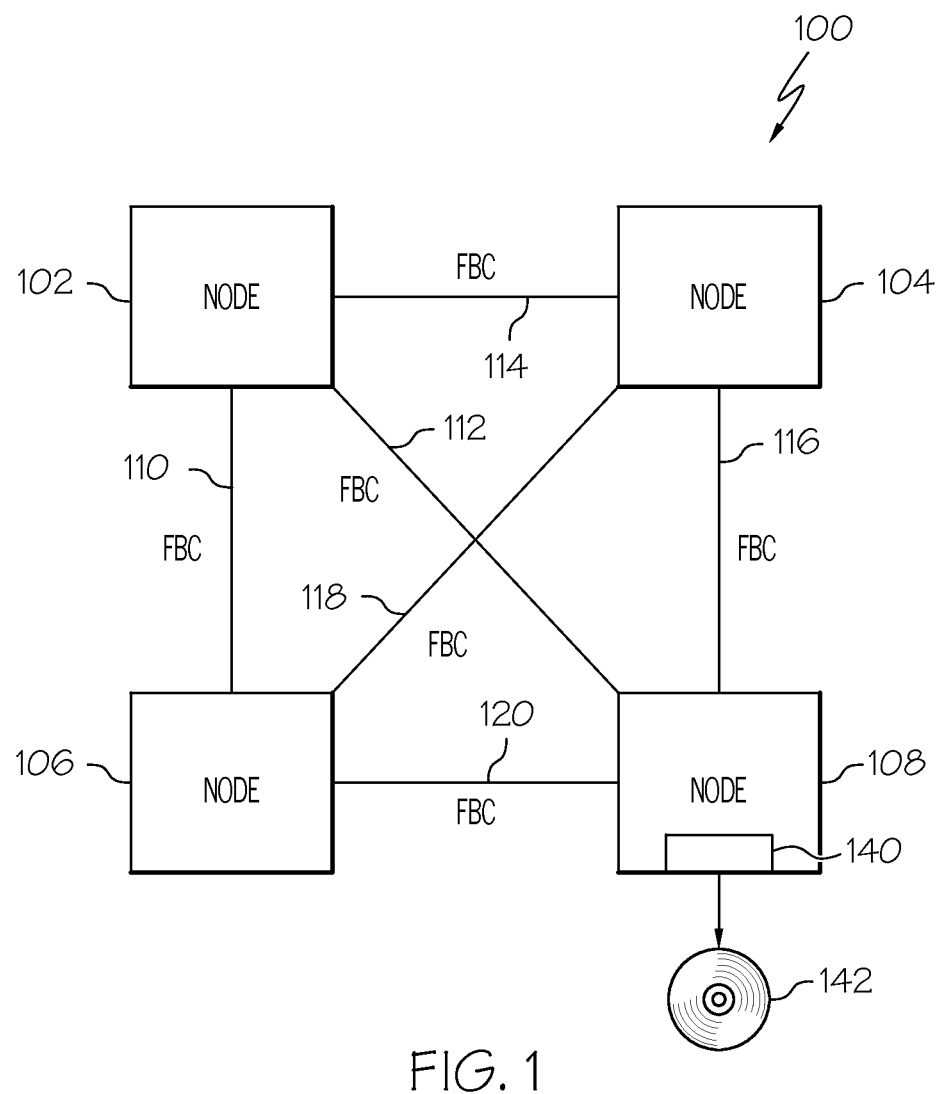
FIG. 1 is a block diagram illustrating one example of a computing system according to one embodiment of the present invention.
Figure 2:
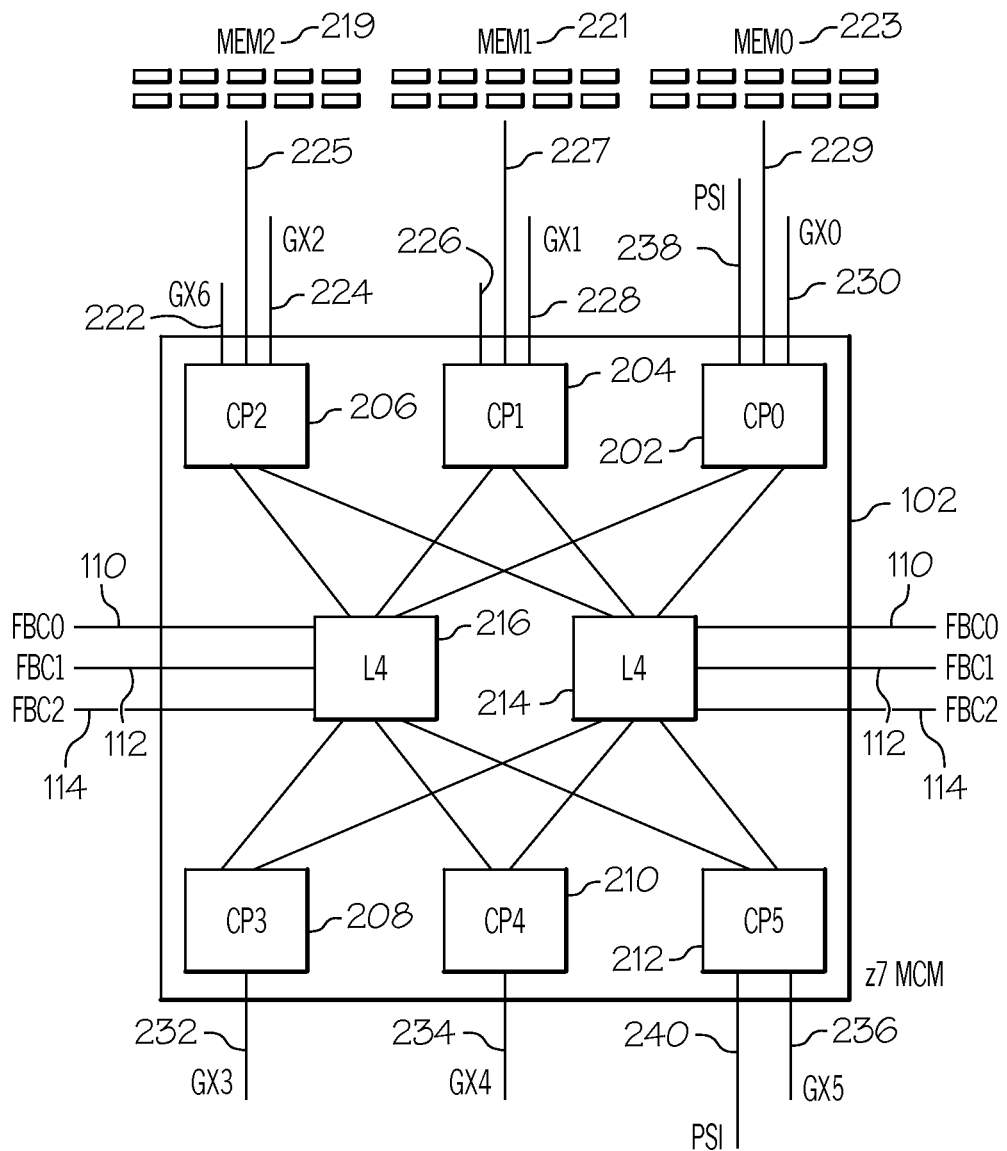
FIG. 2 is a block diagram illustrating one example of a computing node within the computing system of FIG. 1 according to one embodiment of the present invention.
Figure 3:
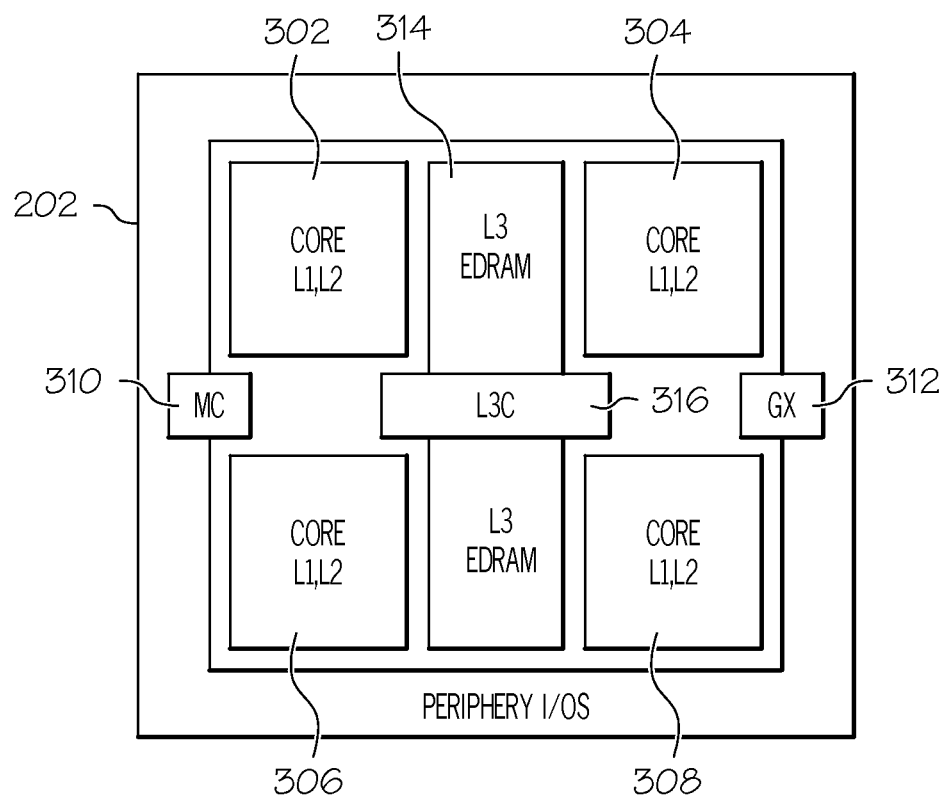
FIG. 3 is a block diagram illustrating one example of a processing chip within the node of FIG. 1 according to one embodiment of the present invention.

FIGS. 1-3 show one example of an operating environment applicable to various embodiments of the present invention. In particular, FIG. 1 shows a computing system 100 that comprises a plurality of computing nodes 102, 104, 106, 108. Each of these computing nodes 102, 104, 106, 108 are communicatively coupled to each other via one or more communication fabrics 110, 112, 114, 116, 118, 120. Communication fabric includes wired, fiber optic, and wireless communication connected by one or more switching devices and port for redirecting data between computing nodes. Shown on node 108 is a storage medium interface 140 along with a computer readable store medium 142 as will be discussed in more detail below. Each node, in one embodiment, comprises a plurality of processors 202, 204, 206, 208, 210, 212, as shown in FIG. 2. Each of the processors 202, 204, 206, 208, 210, 212 is communicatively coupled to one or more higher level caches 214, 216 such as an L4 cache. Each higher level cache 214, 216 is communicatively coupled to the communication fabrics 110, 112, 114 associated with that node as shown in FIG. 1. It should be noted that even though two higher level caches 214, 216 are shown these two higher level caches 214, 216, in one embodiment, are logically a single cache.

A set of the processors 202, 204, 206 are communicatively coupled to one or more physical memories 219, 221, 223 via a memory port 225, 227, and 229. Each processor 204, 206, 208, 210, 212 comprises one or more input/output ports 222, 224, 226, 228, 230, 232, 234, 236. One or more of the processors 202, 212 also comprise service code ports 238, 240 Each processor 204, 206, 208, 210, 212, in one embodiment, also comprises a plurality of processing cores 302, 304, 308 with higher level caches such as L1 and L2 caches, as shown in FIG. 3. A memory controller 310 in a processor 202 communicates with the memory ports 225, 227, 229 to obtain data from the physical memories 219, 221, 223. An I/O controller 312 controls sending and receiving on the I/O ports 222, 224, 226, 228, 230, 232, 234, and 236. A processor 202 on a node 102 also comprises at least one L3 EDRAM cache 314 that is controlled by a cache controller 316. In one embodiment, the L3 EDRAM cache 314 and the L4 cache 214, 216 are shared by all processing cores in the system 100.

The L3 EDRAM cache 314, in one embodiment, is a hierarchical store-through cache structure. Cache accesses are executed under the control of a processing pipe. The pipe is a sequence of processing steps, one per clock cycle, strung together one after another. In each step, in the following called cycle, certain operations are performed e.g. writing data into the cache memory (store) or reading data from the cache memory (fetch).

Various embodiments utilize an interleave organization to segment the L3 EDRAM cache 314. An interleave organization refers to partitioning the cache memory 314 in columns orthogonal to the cache's line structure. Thus, each cache line touches all interleaves. Each interleave is separately addressable. A request, which is passing through a processing pipe, starts at one interleave and proceeds to the next interleave the next cycle until all data has been processed. For example a line fetch requests starts with the interleave holding the line segment, which is needed first, and proceeds to the next interleave until the complete line is read. If the cache's line has 128 bytes and the data to be transferred to and from the cache in segments of 16 bytes, then each interleave would store 16 bytes of a cache line beginning with interleave 0 and line-segment 0. With 8 interleaves, each cache line would cover all interleaves once, with only 4 interleaves twice.

Figure 4:
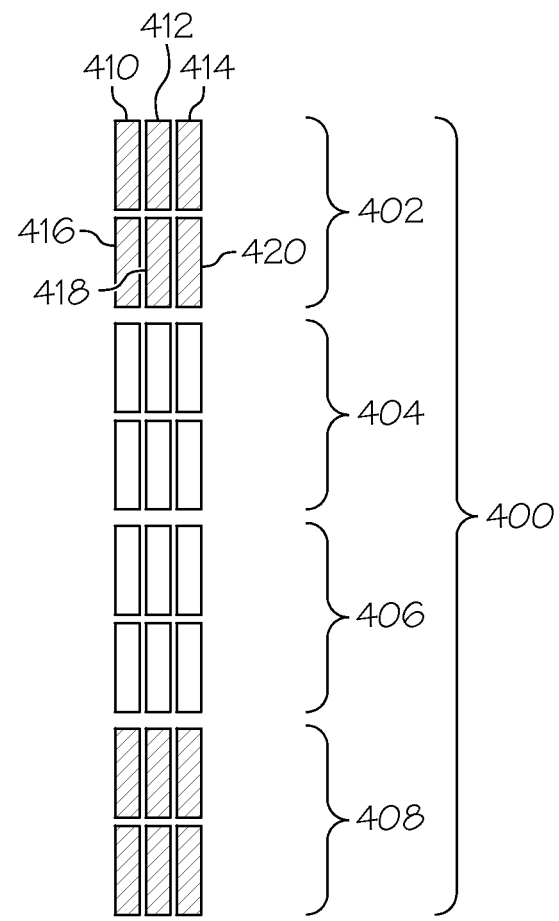
FIG. 4 is a block diagram illustrating one example of a cache interleave structure according to one embodiment of the present invention.

FIG. 4 shows one example of an interleave structure for the L3 EDRAM cache 314. In the example of FIG. 4 an interleave/subarray 400 is an octword (32 bytes) that comprises of 4 double words 402, 404, 406, 408 (8 bytes+8 bits ecc) each. A double word is comprised of 6 macros 410, 412, 414, 418, 420 at 12 bits each. Therefore, a double word, in this example, is 72 bits (64 bits+an 8 bit check).

Mitigating Busy Time in a High Performance EDRAM Cache

As discussed above, the long busy times of EDRAM cache significantly reduces the store throughput of the shared pipeline, which negatively impacts system performance. Therefore, one or more embodiments of the present invention, which are discussed in greater detail below, modify the L3 shared cache pipeline to increase the store throughput. The L3 shared cache pipeline, in one or more embodiments, is modified to support simultaneous processing of two store commands from the lower level caches. This increases the store throughput while not requiring the full overhead of creating two logically independent pipelines. It should be noted that this modification to the processing pipeline is transparent, i.e. does not impact behavior, to all other requestors of the shared pipeline.

Figure 5:
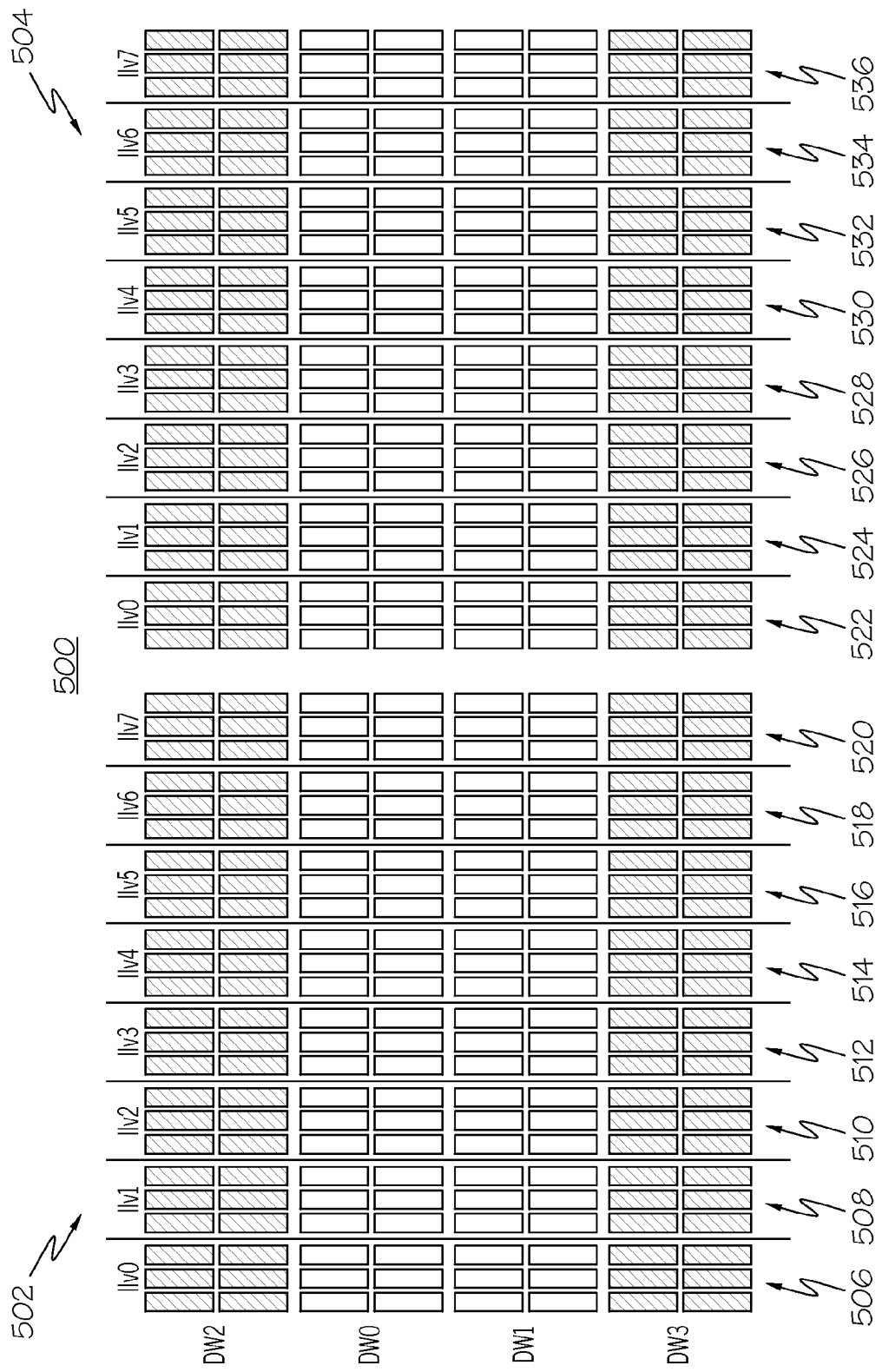
FIG. 5 is a block diagram illustrating one example of a cache array structure according to one embodiment of the present invention.
Figure 6:
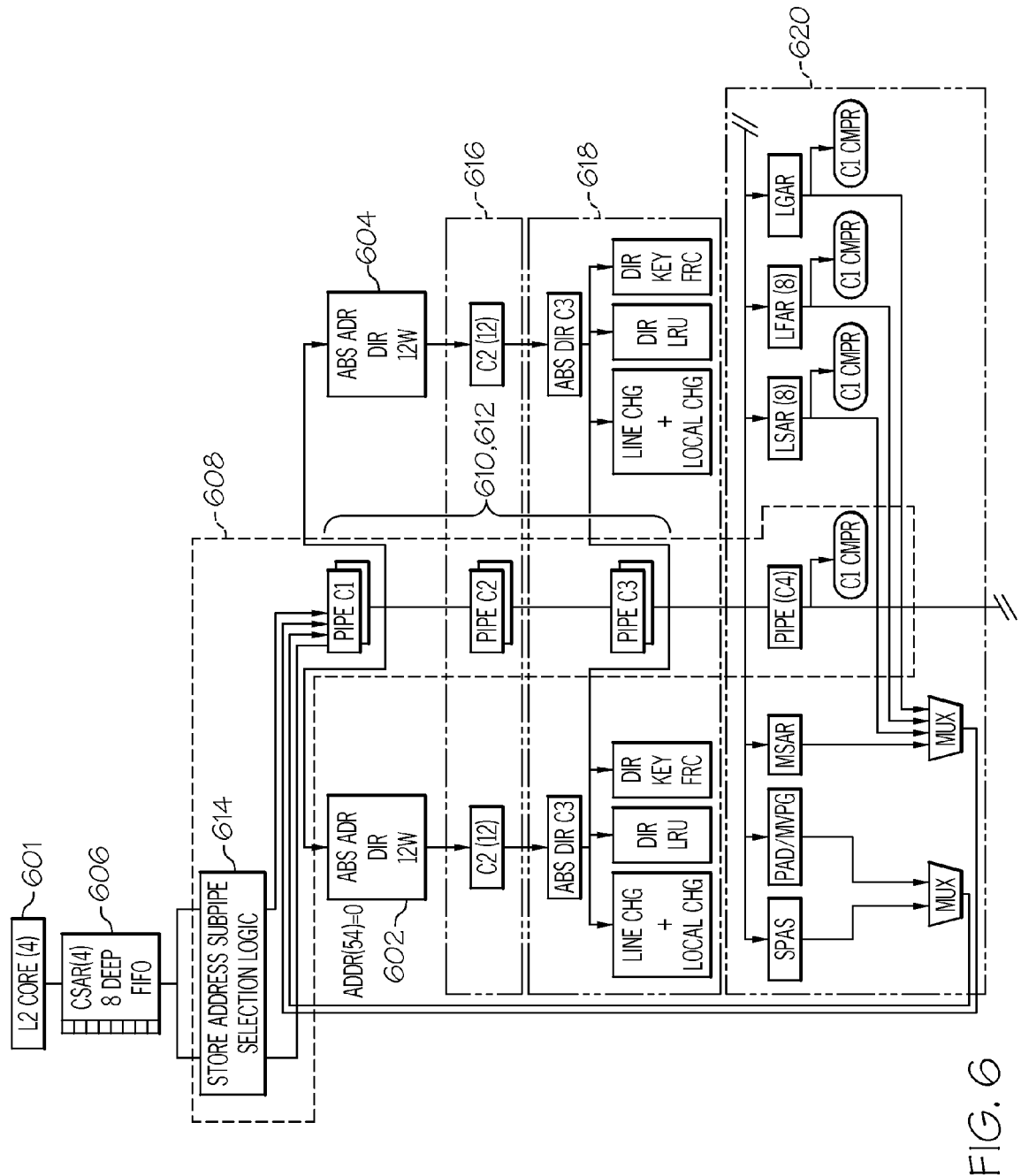
FIG. 6 is a block diagram illustrating one example of a cache controller that simultaneously process store commands in a hierarchical cache according to one embodiment of the present invention.

In one embodiment, a first pipeline modification involves the L3 EDRAM cache directory, which holds the address and ownership tag information for each line in the L3 EDRAM cache 314, since processing stores simultaneously also involves simultaneous multiple directory look ups. Therefore, the directory is address sliced into two halves, which allows stores with different values of the address slice bit to perform look ups at the same time. FIG. 5, for example, shows one cache array structure 500 for the L3 EDRAM cache 314 where the L3 EDRAM cache directory has been addressed sliced split into two halves. For example, if the L3 EDRAM cache 314 is a 24 MB cache, the cache 314 is addressed sliced into two 12 MB slices that are 12-way set associative. FIG. 5 shows that the L3 EDRAM cache 314 has been partitioned into a first slice 502 and a second slice 504. Each slice 502, 504 comprises eight interleaves 506 to 520 and 522 to 536, respectively Each slice 502, 504 is 12 MB, in this example, because each row is 4K, each slice is 12-way, and the line is 256 bytes (4 k rows×12 way×¼ (256 bytes)=12 MB. Each slice also comprises 192 array macros in this example. FIG. 6, which is a more detailed view of the cache controller 316, also shows that that L3 directory has been split into a first half 602 and a second half 604.

A second pipeline modification modifies the management of the EDRAM arrays themselves, to allow a more fine grained access to their component sub-arrays. The EDRAM sub-arrays shared most control and data buses, but this modification allows them to be managed independently allowing stores targeting the different subarrays to overlap. These modifications allowed the shared cache pipeline to handle simultaneous stores with the following conditions. A) Since other requestors are unaware of the pipeline changes, only stores are allowed to send multiple commands at the same time. The stores may not be mixed with other commands. B) The address slicing of the directory means that two stores to be processed together are to target different address slice bits. C) Since the EDRAM subarrays share buses and controls, the two stores cannot target the same subarray. D) Stores are to be processed in order, so multiple stores from the same core cannot be processed together. It should be noted that the impact of these conditions is minimal because the L3 is shared by multiple cores. In other words, there is typically a combination of store requests available that meets the conditions.

Figure 7:
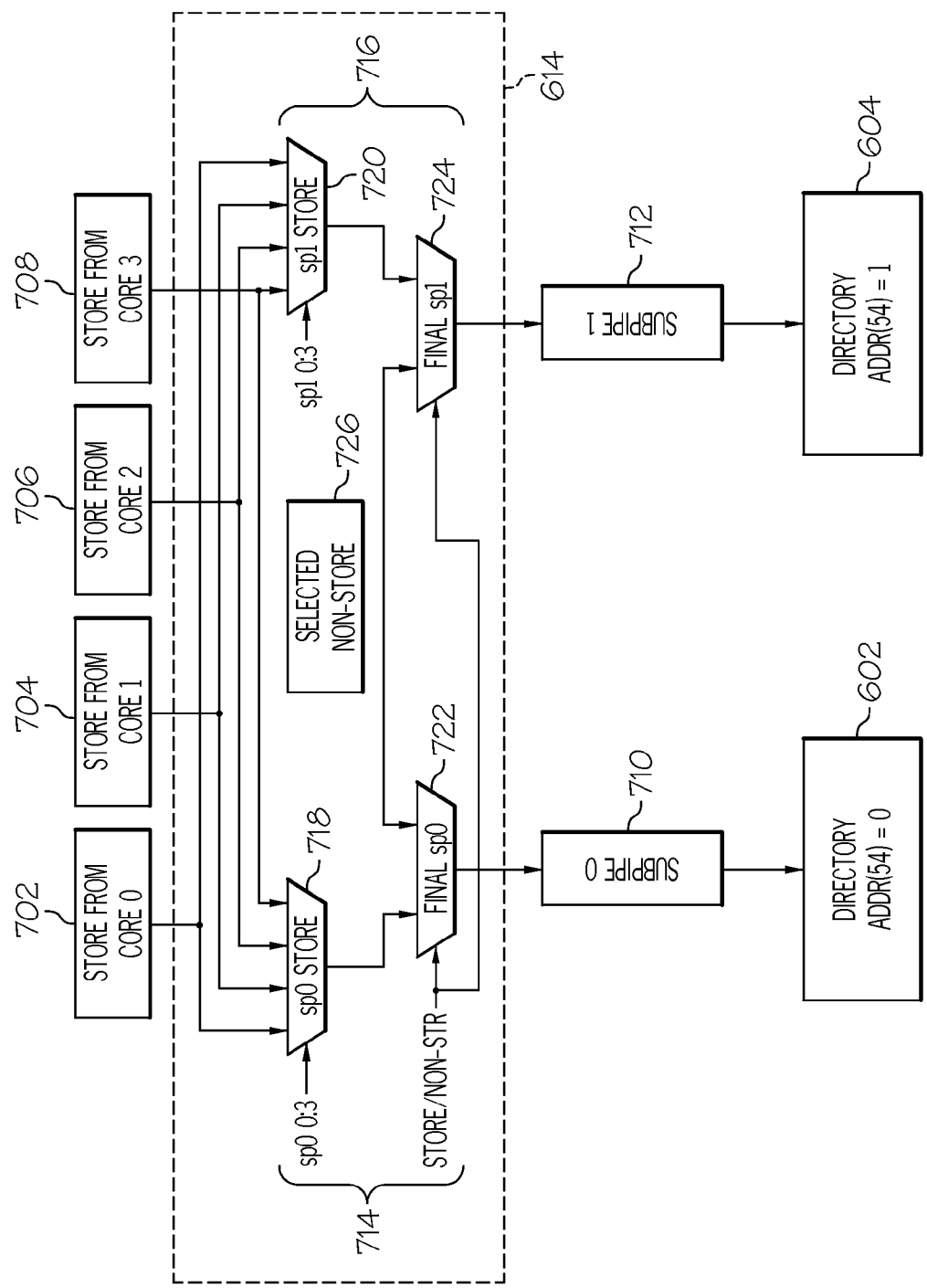
FIG. 7 is a block diagram illustrating a detailed view of store address subpipe selection logic within the cache controller of FIG. 6 according to one embodiment of the present invention.

A more detailed discussion on simultaneously processing two or more store commands from lower level caches is now given with respect to FIGS. 6-7. FIG. 6, as mentioned above, shows a more detailed view of the cache controller 316. When one of the processing cores 302, 304, 306, 308, issues a request, such as a store request, towards the L3 EDRAM cache 314 (as shown by box 601) the requests are stored in request registers, i.e., address registers, normally separately for fetches, stores, and other I/O requests. FIG. 6 only shows the registers 606 (store stacks) associated with store requests for simplicity. Each processing core 302, 304, 306, 308 is associated with its own register 606. The request registers compete for L3 EDRAM cache access. The access itself is controlled by a processing pipe (pipeline) 608. Pipe cycles are numbered C0 (not shown), C1, C2, C3, C4, . . . , etc. C0 (not shown), the first pipe cycle, is the priority cycle where the pipe arbiter selects the request to enter the pipe 608 next.

For example, for performance reasons, fetch requests typically have higher priority than store requests. Because stores to the cache first have to read data from the store buffer before actually writing them to the cache, stores typically occur in a later pipe cycle then fetches. The requests of lower priority, typically stores, access the cache in a later pipe cycle then the higher priority requests, typically fetches. However, because of the store requests' lower priority and the number of store requests that are usually received, the store requests become backed up. Therefore, the pipeline 608 comprises at least a dual pipeline comprising a first pipeline 610 and a second pipeline 612 at cycles C1, C2, and C3. Each of these pipelines 610, 612 is communicatively coupled to a respective L3 directory slice 602, 604. For example, FIG. 7 shows that the pipeline 608 is partitioned into a first subpipe, subpipe_0 710, and a second subpipe, subpipe_1 712. Non-store requests are and store requests can be sent down both subpipes 710, 712, as will be discussed in greater detail below. This allows for the simultaneous processing the store requests for increasing the store throughput of the pipeline 608.

As discussed above, clock cycle C0 is the priority cycle that selects which request can access the pipeline 608. Therefore, during this cycle the store requests in the store register 606 enter into store address subpipe selection logic 614, as shown in FIG. 6. The store address subpipe selection logic 614, in one embodiment, comprises a plurality of MUXs. A first set of MUXs 714 selects the requests that enter the first subpipe 610 and a second set of MUXs 716 select the requests that enter the second subpipe 712.

As the stores 702, 704, 706, 708 enter the store address subpipe selection logic 614 they enter a first MUX 718 and a second MUX 720. The first MUX 718 (which is in the first set of MUXs 714) and second MUX 720 (which is in the second set of MUXs 716) analyze an address bit such as, but not limited to, address bit 54 (with bit 0 being the most significant bit in an address) of each store that indicates an instruction type of store command. If address bit 54 of a store is set to 0 then the first MUX 718 selects the store for the first subpipe, subpipe_0 710. If the address bit 54 of the store is set to 1 then the second MUX selects the store for second subpipe, subpipe_1 712. Therefore, only stores with address bit 54 set to 0 access subpipe_0 710 and only stores with address bit 54 set to 1 access subpipe_1 712.

Once the first and second MUXs 718, 720 select their respective stores these stores are sent to another MUX. For example, the first MUX 718 sends a selected store to a third MUX 722 (also part of the first set of MUXs 714) and the second MUX 720 sends a selected store to a fourth MUX 724 (also part of the second set of MUXs 716). FIG. 7 also shows a selected non-store request 726 since higher level requests are also competing for access to the pipeline 608 as well. These non-stores 726 are sent to the third and fourth 722, 724. The non-stores 726 are able to access either subpipe_0 710 or subpipe_1 712.

It should be noted that for every type of command, e.g., a store command or a fetch command, an address and also some "command" type information is sent down the pipe. With respect to the address information, non "short store" commands, the address is always sent down both subpipes 710, 712, regardless of the subpipe address bit (e.g., address bit 54). Since these commands could be accessing either half of the split directory, the address is sent to both directory halves for the lookup. With respect to "short store" commands, the address is sent down the subpipe that the subpipe address bit indicates. Therefore, a given store only goes through the third MUX 722 or the fourth MUX 724, but not both.

With respect to the command information, for non "short store" commands, the command/mode/key/ . . . etc (non-address pipe fields) are only sent down "command subpipe 0." The L3 cache 314 comprises many pieces of logic that constantly monitor the non-address pipe fields to perform functions based on their values. For example, sending commands or interrupts to various interfaces, reading data from the cache, checking the storage access key. These are all operations "short stores" do not do. Because of this, "short stores" have fewer total pipe fields. Only sending non "short stores" down only one subpipe means these monitoring pieces of logic only have to monitor one "command subpipe" instead of two. Since stores do not require some pipe fields, unnecessary pip fields are not duplicated in "command subpipe 1", which saves latches in the pipeline. With respect to "short stores", the non-address pipe fields are sent only down the "command subpipe" that their subpipe address selection bit designates.

Returning back to FIG. 7, up until point where the stores are assigned to a subpipe, the stores have been analyzed and selected for either access to the first subpipe 710 or the second subpipe 712. Once the stores are assigned to either subpipe_0 710 or subpipe_1 712, the third and fourth MUXs 722, 724 select which requests are to enter their respective subpipe 710, 712. For example, the third MUX 722 can either select a store (with address bit 54 set to 0) or a non-store to access subpipe_0 710 while the fourth MUX 724 selects a store (with address bit 54 set to 1) to access subpipe_1 712 or a non-store to access subpipe_1 712. If the third MUX 722 or the fourth MUX 724 select a non-store then a store is not able to be selected for the other subpipe.

However, in order to process two stores simultaneously, i.e. a store in subpipe_0 710 and a store in subpipe_1 712, the store address subpipe selection logic 614 determines if the stores can physically be processed simultaneously with other. For example, stores can be simultaneously processed if they target different address slice bits and do not target the same cache subarray. It should be noted that in order for stores to be processed simultaneously, they are "short stores", i.e., stores that store either 1DW, 2DW (1QW), 3DW, or 4DW (1 Octword). If a short store (a store targeting up to 1 quadword of an octword) is in one of the subpipes the other subpipe needs to either be empty or contain another short store targeting up to the opposite quadword of the octword. In other words, both stores cannot be targeting the same half of the split directory, as distinguished by address bit 54. Stated differently, two stores cannot be storing to the same "quadword half" of data. "Short" stores can store 1DW, 2DW (1QW), 3DW or 4DW (1OW) total of data. Any of the 16 possible combinations of doublewords to store to is allowed. For example, store_a to DW0 & DW1+store_b to DW2 & DW 3 is allowed; store_a to DW0+store_b to DW3 is allowed; while store_a to entire octword+store_b to entire octword is not allowed; and store_a to DW0+store_b to DW1 is not allowed.

Therefore, the store address subpipe selection logic 614 determines the destination targeted by the stores to determine whether two stores can be simultaneously processed together. In one embodiment, the targeted destination of a store can be determined based on how its address 59 bit is masked. In other words, address bit 59 indicates the doubleword (DW) write vector or the quadword (QW) write vector targeted by the store. For example, the stores, in one embodiment, comprise 4 bits that can be expanded out into a vector that identifies which doubleword or quadword the given store is targeting within the opword. For example, the processing cores 302, 304, 306, 308 can send a store request comprising a mask that indicates that data is to be written to doubleword_0 and doubleword_3 of a given opword. In other words, address bit 59 of each store request indicates the destination being targeted.

For example, if a store is targeting a doubleword store then its DW write vector is identified to determine the DW(s) being targeted. When either the third or fourth MUX 722, 724 want to select a quadword store to enter its subpipe it can only do so if the other MUX has selected a quadword store that is targeting the opposite quadword. For example, because of how the L3 EDRAM cache 314 is interleaved (e.g., 32 bytes in one example) the cache can handle 2 stores (16 bytes each) at once if there is a store targeting the opposite quadword. Therefore, if after analyzing the QW write vector of a first store to be processed in subpipe_0 710 the third MUX 722 determines that the first store is targeting quadword_0 then to simultaneously process another store in subpipe_1 712 a second store needs to target quardword_1. This also applies to stores targeting specific doublewords as well.

Once the store address subpipe selection logic 614 selects a set of stores (short stores) to be processed simultaneously they are sent down their respective subpipes and access their respect cache directory 602, 604 at clock cycle C1, as shown in FIG. 6. For example, as can be seen from FIG. 6 (and FIG. 7), a first store accesses the first cache directory 602 via subpipe_0 610 and a second store accesses the second cache directory 604 via subpipe_1 612. Conventional processing can then be performed for each separate store in the first subpipe 610 and the second subpipe 612. For example, FIG. 6 shows that each subpipe is communicatively coupled to a separate set of conventional components 618, 620 for each of the stores in the first subpipe 610 and the second subpipe 710 to be processed at each of the clock cycles C2 and C3. Each of the stores from the plurality of pipelines finishes their processing in clock cycle C4 via a conventional set of processing components 620.

As can be seen from the above discussion the modified L3 shared cache pipeline supports simultaneous processing of two or more store commands from the lower level caches. This increases the store throughput while not requiring the full overhead of creating two logically independent pipelines.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Operational Flow Diagrams

Figure 8:
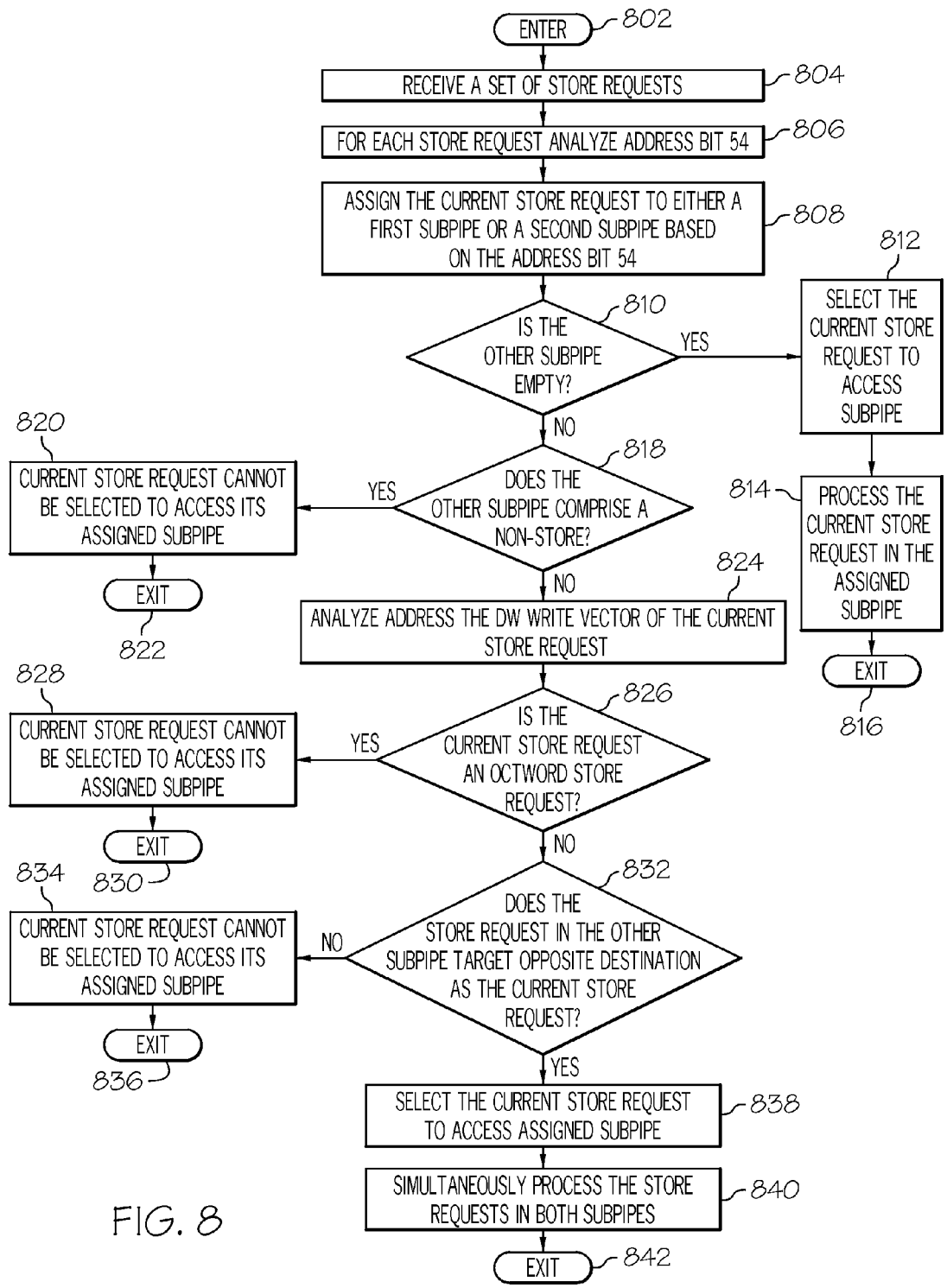
FIG. 8 is an operational flow diagram illustrating one example of a process for simultaneously processing store commands in a hierarchical cache according to one embodiment of the present invention.

Referring now to FIG. 8, the flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 8 is an operational flow diagram illustrating one example of mitigating busy time in an L3 EDRAM cache. The operational flow diagram of FIG. 8 begins at step 802 and flows directly to step 804. The cache controller 316, at step 804, receives a set of store requests. The cache controller 316, at step 806, analyzes, for each store request, address bit 54. The cache controller 316, at step 808, assigns the current store request to either a first subpipe 710 or a second subpipe 712 based on the address bit 54 that has been analyzed. The cache controller 316, at step 810, determines if the other subpipe (e.g., the subpipe not assigned to the current store request) is empty. If the result of this determination is positive, the cache controller 316, at step 812, selects the current store request to access its assigned subpipe. The cache controller 316, at step 814, processes the store request in its assigned subpipe. The control flow then exits at step 816.

If the result of the determination at step 10 is negative, the cache controller 316, at step 818, determines if the other subpipe comprises a non-store. If the result of this determination is positive, the cache controller 316, at step 820, determines that the current store request cannot be selected to access its assigned subpipe. The control flow then exits at step 822. If the result of the determination at step 818 is negative, the cache controller 316, at step 823, analyzes the DW write vector of the current store request to determine the portion of the opword that is being targeted by the store. The cache controller 316, at step 826, determines if the current store request is an octword store request. If the result of this determination is positive, the cache controller 316, at step 828, determines that the current store request cannot be selected to access its assigned subpipe. The control flow then exits at step 830. If the result of this determination is negative, the cache controller 316, at step 832, determines if the store request in the other subpipe targets an opposite destination of the opword. If the result of this determination is negative, the cache controller 316, at step 834, determines that the current store request cannot be selected to access its assigned subpipe. The control flow then exits at step 836. If the determination is positive, the cache controller 316, at step 838, selects the current store request to access its assigned subpipe. The cache controller 316, at step 840, simultaneously processes the store requests in both subpipes. The control flow then exits at step 842.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

Although various example embodiments of the present invention have been discussed in the context of a fully functional computer system, those of ordinary skill in the art will appreciate that various embodiments are capable of being distributed as a computer readable storage medium or a program product via CD or DVD, e.g. CD, CD-ROM, or other form of recordable media, and/or according to alternative embodiments via any type of electronic transmission mechanism.

What is claimed is:

1. A method for mitigating busy time in a hierarchical store-through memory cache structure, the method comprising:
   determining that at least two or more store requests satisfy a plurality of conditions for processing the at least two or more store requests simultaneously, wherein a store request comprises a set of store information comprised of at least a store address;
   performing, in a shared cache pipeline and based on the determining, simultaneous cache lookup operations between a plurality of portions of a cache directory, wherein the performing comprises simultaneously performing
      a first cache lookup operation on a first of the plurality of portions based on a first set of store information within first subpipe of the shared cache pipeline, wherein the first set of store information is associated with a first of the two or more store requests, and
      at least a second cache lookup operation on at least a second of the plurality of portions based on at least a second set of store information within a second subpipe of the shared cache pipeline, wherein the at least second set of store information is associated with at least a second of the two or more store requests; and
   performing a first write operation based on the first cache lookup and at least a second write operation based on the second cache lookup.

2. The method of claim 1, wherein the memory cache is an embedded dynamic random access memory (EDRAM) cache, and wherein the processing further comprises:
   analyzing a set of address masks associated with each of the two or more store requests;
   assigning the first set of store information to the first subpipe in the shared cache pipeline based on the set of address masks that have been analyzed for the first set of store information; and
   assigning the second set of store information to the second subpipe in the shared cache pipeline based on the set of address masks that have been analyzed for the second set of store information.

3. The method of claim 2, wherein the memory cache is an embedded dynamic random access memory (EDRAM) cache, and wherein the processing further comprises:
   analyzing a first write vector associated with the first set of store information;

identifying, based on the first write vector, a first portion in the memory cache targeted by the first set of store information;

analyzing a second write vector associated with a second set of store information;

identifying, based on the second write vector, a second portion in the memory cache targeted by the second set of store information;

placing the first set of store information in the first subpipe based on the first portion in the memory cache that has been identified; and placing the second set of store information in the second subpipe while the first set of store information is in the first subpipe based on the second portion in the memory cache that has been identified.

4. The method of claim 3, wherein the memory cache is an embedded dynamic random access memory (EDRAM) cache, and wherein placing the first set of store information in the first subpipe and placing the second set of store information in the second subpipe further comprises:

determining that the first portion in the memory cache and the second portion in the memory cache are opposite portions in a subarray of the memory cache.

5. The method of claim 1, further comprising:

receiving a plurality of store requests comprising the two or more store requests;

masking a first set of address bits within each of the plurality of store requests, the masking indicating an instruction type of each of the plurality of store requests; and masking a second set of address bits within each of the plurality of store requests, the masking indicating a portion of memory in the memory cache targeted by each of the plurality of store requests.

6. The method of claim 5, wherein the first set of address bits comprises address bit 54 of each of the plurality of store requests.

7. The method of claim 5, wherein the second set of address bits comprises address bit 59 of each of the plurality of store requests.

8. The method of claim 1, further comprising:

determining that the first subpipe of the shared cache pipeline comprises a non-store request; and preventing a set of store information from being placed in the second subpipe of the shared cache pipeline.

* * * * *